US009062606B2

(12) United States Patent
Lorenz et al.

(10) Patent No.: US 9,062,606 B2
(45) Date of Patent: Jun. 23, 2015

(54) COMBUSTION TURBINE IN WHICH COMBUSTION IS INTERMITTENT

(76) Inventors: Edmund Lorenz, Grossklein (AT);
Franz Niederl, Leibnitz (AT); Helmuth Gabl, Graz (AT)

( * ) Notice: Subject to any disclaimer, the term of this patent is extended or adjusted under 35 U.S.C. 154(b) by 1036 days.

(21) Appl. No.: 13/060,841

(22) PCT Filed: Aug. 5, 2009

(86) PCT No.: PCT/AT2009/000301
§ 371 (c)(1),
(2), (4) Date: Feb. 25, 2011

(87) PCT Pub. No.: WO2010/022416
PCT Pub. Date: Mar. 4, 2010

(65) Prior Publication Data
US 2011/0214409 A1    Sep. 8, 2011

(30) Foreign Application Priority Data
Aug. 26, 2008   (AT) .................................. A 1323/2008

(51) Int. Cl.
*F02G 1/00*   (2006.01)
*F02G 3/00*   (2006.01)
(Continued)

(52) U.S. Cl.
CPC ... *F02C 5/12* (2013.01); *F02C 5/02* (2013.01); *F02K 7/06* (2013.01); *F23R 7/00* (2013.01); *Y02T 50/671* (2013.01)

(58) Field of Classification Search
CPC ..................... Y02T 50/675; F23R 3/06; F23R 2900/03044; F23R 3/002; F01D 9/023
USPC ............................ 60/39.38, 247, 39.76; 431/1
See application file for complete search history.

(56) References Cited

U.S. PATENT DOCUMENTS

| 2,493,873 A | 1/1950 | Hill |
| 2,557,198 A | 6/1951 | Nichols |

(Continued)

FOREIGN PATENT DOCUMENTS

| AT | 311735 | 11/1973 |
| AT | 379217 B | 12/1985 |

(Continued)

OTHER PUBLICATIONS

Espacenet, English abstract of JP2005207359, printed Oct. 10, 2013.

(Continued)

*Primary Examiner* — Craig Kim
(74) *Attorney, Agent, or Firm* — Cahn & Samuels, LLP

(57) ABSTRACT

The subject of the present invention is a combustion turbine (1) for intermittent combustion with at least one combustion chamber (3) having inlet valves (2) and an ignition device (18), the at least one combustion chamber (3) having no shut-off devices on the off-gas side and being thus open on the off-gas side at all times. Downstream of the at least one combustion chamber (3), a turbine (4), which can be impinged with process gas obtained in the combustion chamber (3), is positioned, with a flow-through chamber (5) being positioned between the at least one combustion chamber (3) and the turbine (4) axially behind the at least one combustion chamber (3). The flow-through chamber (5) is separated from the at least one combustion chamber (3) by a guiding plate (6) or a further turbine (7).
The subject of the present invention is furthermore a process for operation of a combustion turbine (1) and a drive system for a machine having as its core a combustion turbine (1) according to the invention.

20 Claims, 2 Drawing Sheets

(51) Int. Cl.
 *F02C 5/00* (2006.01)
 *F02C 5/12* (2006.01)
 *F02C 5/02* (2006.01)
 *F02K 7/06* (2006.01)
 *F23R 7/00* (2006.01)

(56) References Cited

U.S. PATENT DOCUMENTS

| | | | |
|---|---|---|---|
| 3,877,219 | A | 4/1975 | Hagen |
| 4,050,238 | A | 9/1977 | Holzapfel |
| 4,570,438 | A | 2/1986 | Lorenz |
| 5,692,370 | A | 12/1997 | Stuhlmuller et al. |
| 6,370,864 | B1 | 4/2002 | Murphy |
| 6,584,774 | B1 * | 7/2003 | Stanek ............... 60/740 |
| 6,634,175 | B1 | 10/2003 | Kawata et al. |
| 2008/0115480 | A1 * | 5/2008 | Rasheed et al. ......... 60/39.76 |

FOREIGN PATENT DOCUMENTS

| | | |
|---|---|---|
| CN | 88101204 A | 9/1988 |
| CN | 1138364 A | 12/1996 |
| DE | 2 232 025 | 1/1974 |
| DE | 25 17 947 A1 | 10/1976 |
| JP | 2000346361 | 12/2000 |
| JP | 2005207359 | 8/2005 |

OTHER PUBLICATIONS

Espacenet, English abstract of JP200034361, printed Oct. 10, 2013.
Japanese Patent Office, Office Action in App. No. 2011-524128, Aug. 25, 2013.
Espacenet, English abstract of CN1138364 (A), printed on Aug. 21, 2013.
State Intellectual Property Office of the P.R.C., Chinese Application No. 200122, Chinese Office Action dated Apr. 2, 2013.

* cited by examiner

COMBUSTION TURBINE IN WHICH COMBUSTION IS INTERMITTENT

This application is the National Stage of International Application No. PCT/AT2009/000301, filed on Aug. 5, 2009, which claimed the benefit of Austrian Application No. A1323/2008 filed Aug. 26, 2008, which are hereby both incorporated by reference. The International Application No. PCT/AT2009/000301 was published on Mar. 4, 2010.

I. FIELD OF THE INVENTION

The subject of the present invention is a combustion turbine for discontinuous combustion, with at least one combustion chamber having an inlet valve or inlet valves and an ignition device. The at least one combustion chamber does not have shut-off devices on the off-gas side and is thus open on the off-gas side at all times. Downstream of the at least one combustion chamber, a turbine, which can be impinged with process gas obtained in the combustion chamber, is provided. A flow-through chamber is positioned between the combustion chamber and the turbine axially behind the combustion chamber.

The subject of the present invention is furthermore a process for operation of a combustion turbine.

The invention also relates to a drive system for a machine having as its core a combustion turbine according to the invention.

II. BACKGROUND OF THE INVENTION

On the one hand, conventional, state-of-the-art turbine engines constantly lose energy on account of the required air compressing process (compressor work) ahead of the infeed into the combustion chamber. On the other hand, fuel must be injected constantly in order to safeguard the turbine function and operation, even if the turbine operates under low load. This leads to high energy consumption combined with a heavy environmental impact.

Piston engines make discontinuous fuel feed possible. One piston motor type, the planetary piston engine (rotation engine or Wankel engine) generates a rotational movement directly from the combustion process. Apart from being advantageous in terms of intermittent fuel feed, planetary piston motors offer further benefits over conventional reciprocating piston motors: they are lighter and have fewer components (there are no drive rods or crank shafts), their control is simpler and, due to the reduced friction losses at the cylinder faces, their efficiency is higher. However, this type of motor has not been fully accepted on the market due to the difficulty of sealing the three gas-tight chambers and the due to the eccentric bearing with the eccentric shaft.

Combustion turbines with combustion chambers for intermittent operation are also already known.

For instance, the Austrian patent specification AT 311 735 describes a combustion turbine for intermittent combustion in combustion chambers comprising inlet valves. Here, charging, combustion, and expansion of the fuel take place successively at periodical intervals. The inlet valves are actuated by a cam shaft driven by an electric motor. The electric motor is controlled electronically by means of temperature and pressure sensors located in the combustion chambers. Combustion turbines circumvent the high friction losses occurring in reciprocating piston engines due to the sealing elements, which account for an average 15% to 25% of the overall output (up to 40% in partial load operation). However, it has so far not been possible to realize satisfactory control of this combustion turbine.

AT 379 217 discloses a similar impulse-driven gas turbine, where a near-isochore combustion characteristic is ensured by the guide vane/runner combination and a controlled inlet system. The inlet system comprises a rotatable valve disc with openings and provided with a drive and controls. But so far it has not been possible technically to close the valve disc gas-tightly during the deflagration process. In addition, this combustion turbine has a complicated and labyrinthine structure, leading to power output losses and high manufacturing costs.

U.S. Pat. No. 2,557,198 A discloses a gas turbine with intermittent combustion, where the combustion chambers each have inlet and outlet valves. Two turbines are placed directly after the combustion chamber, with a chamber for compensating pressure fluctuations arranged between the turbines. Here, too, the use of valve discs causes sealing problems during operation; in addition, the off-gas side valve disc is exposed to very high temperatures, and this is why problems of wear and of heat deformation are to be expected at this point in particular.

DE 2 232 025 A1 discloses a gas turbine system—in particular a drive gear with constant volume combustion with a compressor—which consumes a lot of compression energy and consequently reduces the total efficiency considerably. The mechanically complex and interference-prone outlet valves at the combustion chamber are avoided. In a special embodiment of DE 2 232 025 A1, the combustion chamber room is divided into a primary and a secondary room, separated by a constriction. However, the constriction causes the combustion gases to flow back and, therefore, a difference in the filling of the primary and secondary chambers.

A further embodiment of DE 2 232 025 A1 shows a combustion turbine with combustion chambers located around the turbine. Such an arrangement leads to high turbine bearing temperatures and the need for cooling these. In addition, in such an arrangement, the combustion gases coming from the combustion chambers are diverted by 180° before hitting a compressor turbine. This diversion leads to unbalanced flow to the turbine and to power output losses.

DE 25 17 947 A1 discloses a turbo jet engine with combustion chamber for pulsating combustion, i.e. a drive gear working according to the constant volume combustion process, which operates in a periodical working process. FIG. 4 of DE 25 17 947 A1 discloses an embodiment in which a radial ejector, a pressure compensation chamber and a turbine are placed on the side of the outlet of the combustion chamber.

III. SUMMARY OF THE INVENTION

The invention therefore purports to disclose a combustion engine with a simple structure, which would transform the kinetic energy of the combustion gases directly into a rotational movement without having to cope with the disadvantages of turbine engines or piston engines outlined in the foregoing.

This task is solved by a combustion turbine for intermittent combustion. In this, the flow-through chamber is separated from the at least one combustion chamber by a guiding plate designed as a perforated plate or swirl grid.

Separation of the flow-through chamber against the at least one combustion chamber by a guiding plate causes the process gas to flow more uniformly.

The axial placement of the flow-through chamber downstream of the at least one combustion chamber is advantageous in that the flow of the process gas in the flow-through chamber becomes thus also uniform and output losses due to diversion of the process gas flow are avoided. The combustion turbine consequently has a compact and linear structure.

The combustion turbine according to the invention only needs inlet valves. No hot-gas (off-gas) valves or slides involving certain technical difficulties are used. There are no dissipation losses that have to be spent on the work at the outlet valves of conventional Otto engines or compression-ignition engines. The new concept avoids gas cycle losses (up to 40% in Otto engines in neutral gear). No losses will occur in the expulsion of the combustion gases and no expansion work is necessary to open an outlet valve.

Further advantageous embodiments are the subject of the detailed description.

Advantageously, the flow-through chamber has valve openings through which, preferably, air can be fed. Thus, preferably cold air can be fed to the flow-through chamber shortly before ignition in a combustion chamber. After ignition, the hot process gas flowing from the combustion chamber will shove this cold air from the flow-through chamber through the turbine. This results in an increase of output and in a cooling effect for the gas turbine.

It is useful for the flow-through chamber to be provided with a secondary ignition system. With it, previously unburnt fuel particles can be burnt. In this manner, the flow-through chamber fulfils the purpose of a post-combustion chamber. This makes it possible, for instance, to use tar-containing fuels to fire the combustion turbine. Due to the high temperatures in the combustion chambers, the tarry constituents of the fuel are cracked and can subsequently be burnt in the flow-through chamber. It is also conceivable to inject additional fuel into the flow-through chamber, for instance through an injection nozzle. This fuel increases the power output of the combustion turbine (booster turbine). It can be ignited with the secondary ignition system or also by auto-ignition.

It is advantageous for the guiding plate to be designed as a screen plate, because this results in more uniform process gas flow.

In an advantageous embodiment of the invention, a guide vane mechanism is positioned between the flow-through chamber and the turbine in order to generate a swirl flow. This permits achieving a higher flow rate of the process gas through the turbine and therefore, higher output. This means that the turbine can be smaller for the same output. An essential advantage of the swirl flow lies in the improved acoustic decoupling of the flow noises and the pressure fluctuation in the combustion chambers. Preventing the pressure fluctuations by swirl flow also leads to a more uniform temperature distribution over the entire flow cross-section and thus, lower maximum temperatures at the turbine inlet.

It is also useful for flow guide elements for generation of a swirl flow to be provided as early as in the flow-through chamber.

Very favourable flow conditions are also created in the combustion turbine by designing the flow-through chamber as laval nozzle.

In a further advantageous embodiment of the invention, the combustion turbine is provided with several, preferably four, combustion chambers. These combustion chambers can be operated singly or jointly over any partial output or load range from 0 to 100%, resulting in further essential energy savings at reduced NOx, CO, HC+NOx and $CO_2$ emissions. Advantageously, the combustion chambers are connected to a joint flow-through chamber.

The subject of the present invention is furthermore a process for operation of a combustion turbine, where air is fed through inlet valves to at least one combustion chamber, mixed with a fuel and burnt in the combustion chamber which is not closed on the outlet side, and where a turbine is impinged with the process gas obtained in this manner, with the process gas flowing through a flow-through chamber positioned axially downstream of the at least one combustion chamber before impinging the turbine with it. The process gas is fed from the at least one combustion chamber to the flow-through chamber via a guiding plate designed as a perforated plate or swirl grid.

This guiding plate cause(s) the process gas flow to be more uniform, in addition to the effect caused by the flow-through chamber.

Advantageously, air is added to the process gas in the flow-through chamber intermittently, the air subsequently being shoved through the turbine, resulting in increased output of, and a cooling effect on, the combustion turbine.

It is advantageous to provide for post-combustion of the process gas in the flow-through chamber. It is also conceivable to inject additional fuel into the flow-through chamber for post-combustion.

In a very advantageous embodiment of the process, the process gas downstream of the at least one combustion chamber is caused to swirl before being fed to the turbine. This results in higher turbine speed and/or acoustic decoupling of the combustion chamber versus the turbine.

The invention also covers a drive system for machines such as vehicles, aircraft, ships, generators, construction machines and gears by means of a combustion engine.

IV. BRIEF DESCRIPTION OF THE DRAWINGS

The invention is described below with reference to the drawings, where

V. DETAILED DESCRIPTION OF THE DRAWINGS

Figure 1:
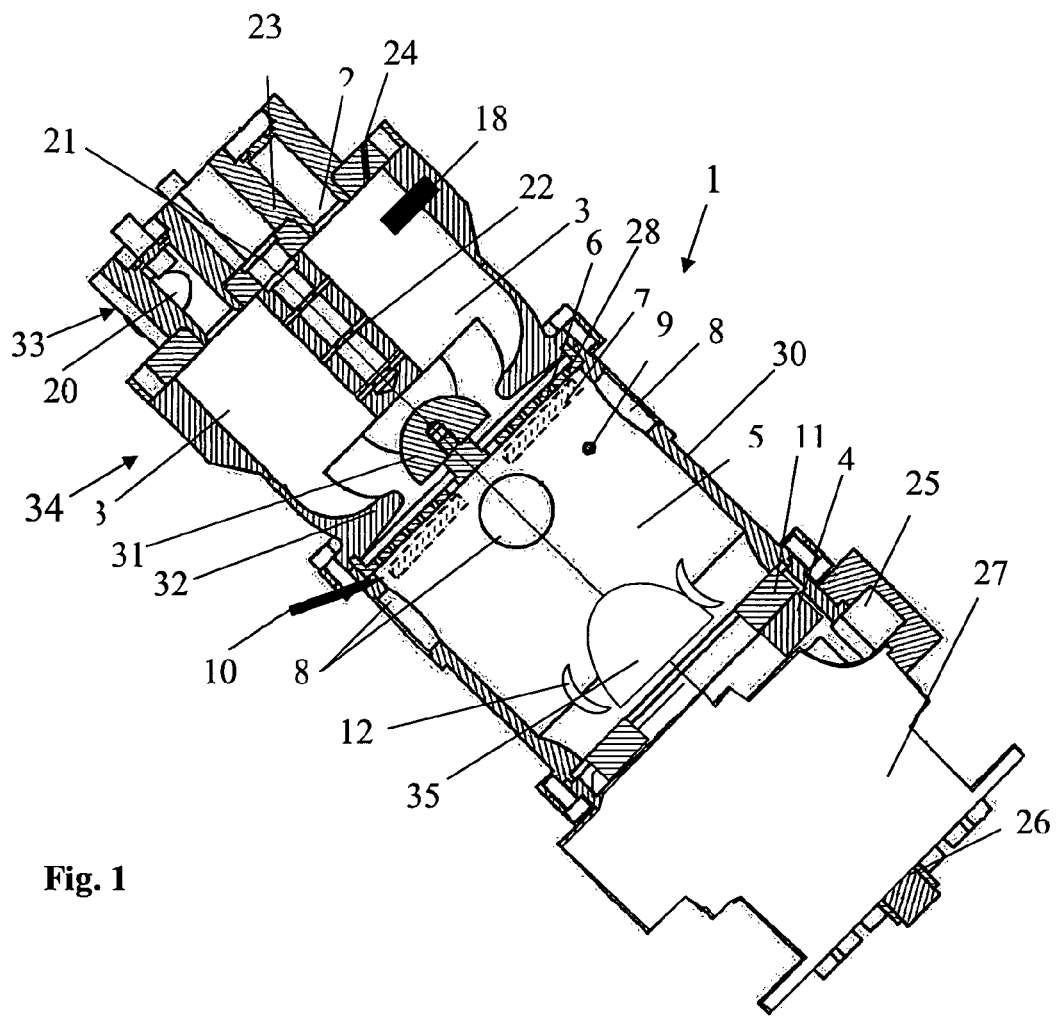
FIG. 1 shows a schematic longitudinal view of a combustion turbine according to the invention.

FIG. 1 shows a longitudinal section through a possible embodiment of the invention. The combustion turbine 1 represented consists essentially of a primary valve head 33, a combustion chamber area 34, a subsequent flow-through chamber 5, a turbine 4 and a drive shaft 26 with bearing casing 27.

The primary valve head 33 is tightly connected to the combustion chamber area 34 and it delineates the upside of the combustion chambers 3. Inlet valves 2, which are placed in valve holders 23, are accommodated inside the primary valve head 33.

In the present example, the combustion chamber area 34 comprises four cylindrical combustion chambers 3, into which air is fed via air inlet opening 20, respectively inlet valves 2, and fuel is fed via the fuel feed system 24. The fuel feed system 24 may be designed as one or several injection nozzles (single nozzles or rows of nozzles, e.g. with Piezo injectors).

It is also conceivable for the fuel to be added to the air outside combustion chambers 3. In this case, a fuel/air mixture would be fed to the combustion chambers 3 via inlet valves 2.

The infeed of combustion air and of the fuel to the combustion chambers 3 can be equipped with conventional suction motors or conventional injection systems and nozzle forms.

A starter vent tube 21 with starter vents 22 is placed inside the four combustion chambers 3.

Each combustion chamber 3 is provided with an ignition device 18 for igniting the fuel/air mixture. Ignition device 18 may be designed as a conventional spark plug or as modern ignition system such as a laser ignition system.

At the end of combustion chambers 3, the combustion chamber constriction 32 or a hemispherical flow divider 31 is located. The combustion chambers 3 are followed by a guiding plate 6, in the present case designed as a screen plate with individual guiding plate openings 28. The guiding plate 6 causes the process gas flow to become more uniform. In addition to guiding plate 6, a further turbine 7 can be positioned downstream of the combustion chambers 3. The further turbine 7 is indicated by dash-dot lines in FIG. 1.

Between combustion chambers 3 and the turbine 4, the flow-through chamber 5 is located; in the present case it is cylindrical and formed by the flow-through chamber wall 30. The flow-through chamber 5 is located axially behind the combustion chamber 3, this means that the combustion chambers 3 and the flow-through chamber 5 have substantially the same longitudinal axis or that the longitudinal axes of the combustion chambers 3 and the longitudinal axis of the flow-through chamber 5 are situated parallel to each other. On account of this structure, the process gas will flow from the combustion chambers 3 into the flow-through chamber 5 without much diversion or directional change. The flow-through chamber 5 has valve openings 8, through which air is fed additionally to the combustion turbine 1. Optionally, fuel for post-combustion can be fed to the flow-through chamber 5 via injection nozzle 10. The flow-through chamber 5 may also have a secondary ignition system 9. A secondary ignition system 9 is superfluous if the temperature of the process gas from the combustion chambers 3 is higher than the auto-ignition temperature of the additional fuel feed. The fuel fed to the flow-through chamber 5 may have different material properties, e.g. a different auto-ignition temperature, than the fuel feed to the combustion chamber 3. The fuel can also be fed to the flow-through chamber 5 via valve openings (inlet valves) 8. It goes without saying that the combustion turbine can be operated without post-combustion.

A guide-vane mechanism 11, which causes a swirl flow in the process gas, is placed between flow-through chamber 5 and the turbine 4. For this purpose, the (upstream) flow-through chamber 5 may be provided with flow guiding elements 12. The guide-vane mechanism 11 may be a swirl grid, for example. The flow-through chamber 5 may also be designed as laval nozzle (not represented). The laval nozzle could also guide the process gas in a swirl.

The turbine 4 is supported in the bearing casing 27 via by the drive shaft 26, the drive energy being carried off to the outside via drive shaft 26. It is conceivable for the further turbine 7 to be also directly connected to drive shaft 26, which would mean that the drive shaft 26 extends through the flow-through chamber 5. Downstream of turbine 4, off-gas channel 25 is provided for discharge of the off-gas.

Figure 2:
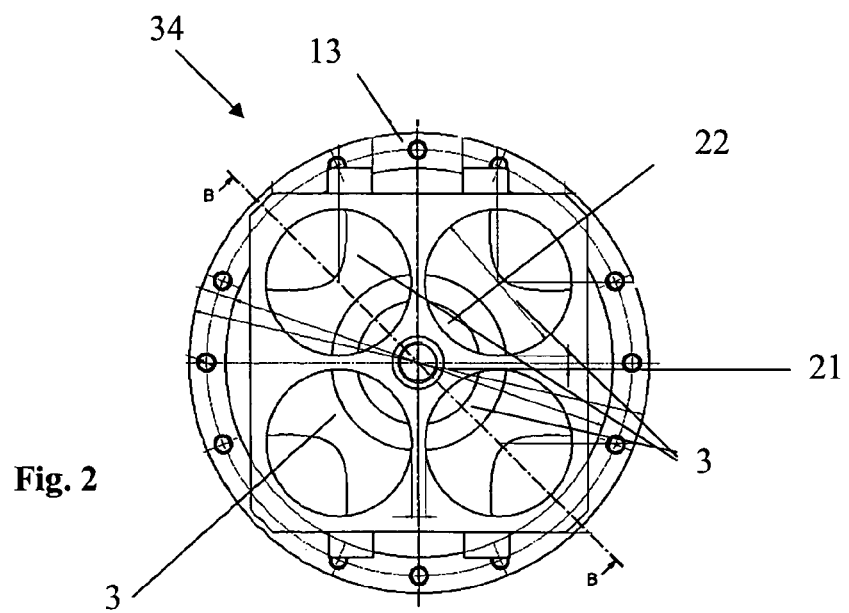
FIG. 2 shows a view of the combustion chamber area of a combustion turbine according to the invention.

FIG. 2 shows a view of the combustion chamber area 34. The starter vent tube 21 with lateral starter vents 22 can be clearly seen. The combustion chamber area 34 is connected or screwed to the flow-through chamber wall 30 with connecting flange 13.

Figure 3:
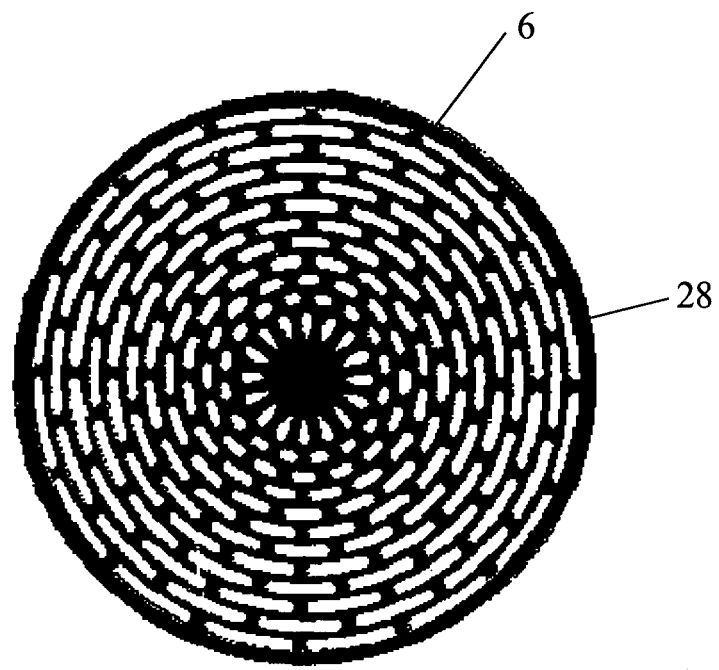
FIG. 3 shows a schematic view of the guiding plate.

FIG. 3 shows the guiding plate 6 with the guiding plate openings 28. In the present example, these guiding plate openings 28 are designed as slots and parallel-walled, but they may also be circular or take any other shape. The passage may be cylindrical, conical, laval-shaped, etc., depending on the fuel used. It is also conceivable for the guiding plate 6 to be provided with flow guiding elements for the purpose of generating a swirl flow.

The functional principle of the combustion turbine 1 according to the invention is described in the following.

For the starting process of the combustion turbine 1, pre-compressed air or starter gas is fed for the combustion process via the starter vent tube 21 and starter vents 22 into the combustion chambers 3; the inlet valves 2 are closed. Fuel is added to the air or the starter gas and the mixture is ignited by means of the ignition device 18. The expanding process gas then causes the turbine 4 to start rotating.

Alternatively, an external activation can take place to start the turbine 4 with the inlet valves 2 being open. The rotating turbine 4 thereby creates underpressure in the combustion chambers 3 and consequently combustion air is sucked in through inlet valves 2. Then inlet valves 2 are closed, fuel is injected and the mixture is ignited immediately. The resulting process gas now drives the turbine 4. External activation of the turbine 4 is then no longer required.

During normal operation, the rotating turbine 4 sucks in combustion air into the combustion chambers 3 through the open inlet valves 2. Optionally, the combustion air may be pre-compressed mechanically or thermally.

After closing the inlet valves 2, the fuel is injected and ignition is triggered immediately. The valve can be piloted via a cam shaft or using the camless principle. The time of the closing of the inlet valve 2 and, therefore, the flow rates, can be stoichiometrically harmonized precisely with the drive power requirement.

Ignition of the fuel/air mixture results in rapid increase of the temperature. As the process is run more or less isochorely (V=constant), immediate pressure increase will ensue according to the gas equation. However, the process gas can only expand axially toward guiding plate 6 and the flow-through chamber 5 for becoming more uniform, until it finally hits the turbine 4 and provides the latter with additional rotational energy. The guiding plate 6 may also be designed as swirl grid. The output is discharged via drive shaft 26 and furnished to external consumers, e.g. a generator 14. The persistent axial arrangement for the flow through the entire machine means that there is a clear, simple geometric structure with exceptionally high efficiencies. In the following cycle, one inlet valve 2 or several inlet valves 2 are opened and combustion air is sucked into/pressed into the corresponding combustion chamber 3.

In addition to guiding plate 6, a further turbine 7 can be positioned. This further turbine 7 can be either directly connected to drive shaft 26 of turbine 4 or be equipped with its own drive shaft for uncoupling energy from combustion turbine 1.

If the combustion chamber area 34 comprises several combustion chambers 3, there is a choice of operating either one single or several combustion chambers 3 simultaneously or sequentially, according to the desired power output. Singular injection systems and single ignitions are advantageous in that each combustion chamber 3 can be adjusted to the optimized combustion and output requirement, for instance, by targeted fuel flow rate proportioning per combustion chamber 3. Stoichiometric combustion is safeguarded by the present invention over all load ranges. This translates into optimum fuel utilization combined with low off-gas values. Laser ignition systems—permitting to adjust the ignition depth in the combustion chamber 3—offer additional advantages here.

The variable valve and burner chamber controls (singly or together) allow for optimum design of the torque characteristics, while also reducing consumption in the partial load range. Contrary to piston engines, the piston phase position need not be taken into account, because the invention presented does not include pistons. Furthermore, no return flow of residual gases will occur when the combustion chamber is being filled.

Additionally, the combustion chamber pressure during filling is more or less equivalent to the ambient pressure. This means that the pressure required for opening and closing the inlet valve or valves 2 can be reduced by 60 to 80%. This proves especially advantageous in electromechanically piloted inlet valves 2, in respect of energy consumption, speed (linear adjustment) and accuracy of valve adjustment.

Control of ignition and the injection procedure is preferably realized electronically, but can be also electrical, mechanical/hydraulic or as a combination of the systems mentioned. It is advantageous to base the control and regulation of the inlet valves 2, the fuel feed system 24 and the ignition device 18 on combustion parameters such as the $CO_2$ emission, fuel consumption, combustion temperatures, atmospheric pressure, load pressure, injection time, injection pressure, injection quantity, beginning of the injection, etc. These combustion parameters can be determined using sensors.

In flow-through chamber 5, the process gas flow from the combustion chambers 3 is made more uniform. Additionally, air, preferably cold air, is fed to the flow-through chamber 5 via the valve openings 8, namely shortly before igniting a fuel/air mixture in one or several combustion chambers 3. The valve openings 8 are closed shortly before ignition taking place in the combustion chambers. The expanding process gas from the combustion chambers 3 will shove this cold air from the flow-through chamber 5 also through the turbine 4. In the present example, post-combustion is operated in flow-through chamber 5, wherefore a secondary ignition system 9 and one or several injection nozzles 10 are provided in flow-through chamber 5.

If the temperature of the process gas flowing from the combustion chambers 3 is higher than the auto-ignition temperature of the fuel feed to the flow-through chamber 5, post-combustion can be operated in flow-through chamber 5, without the need for a secondary ignition system 9.

Due to the flow guiding elements 12 in flow-through chamber 5 and/or the guide vane mechanism 11, the process gas flow is caused to swirl, which effect essentially continues up to the turbine inlet area. The swirl substantially increases the flow rates, while the pressure loss is reduced.

The swirl flow from the flow-through chamber 5 can be split into an axial and a radial inflow component to the guide vanes of the guide-vane mechanism 11 or if designed without guide vanes, the runner of the turbine 4. On account of the direction of the rotation of the swirl, a diversion of the gas flow in the direction of the guide vanes of the guide-vane mechanism 11 is fed to the gas flow.

It is possible to place a flow guiding element 35 in the flow-through chamber 5; in the present example, it takes the shape of a parabola. It is preferably positioned in the end section of the flow-through chamber 5. The combustion chambers 3 can also be equipped with elements creating a whirl or a swirl.

To cool the combustion turbine 1, it can be surrounded by a heat exchanger, designed, e.g., as a double jacket. In this case, the turbine off-heat can be used for heating purposes. It is also conceivable for the bearings of the drive shaft 26 to have a cooling system.

As fuel for the combustion turbine 1, any liquid, gaseous and ignitable hydrocarbon compound available on the market (e.g. benzenes, diesel, including various bio-diesels, methanol, ethanol, other alcohols, biogases, digester gases, natural gases, kerosene, pulverized coal dust, etc.) but also hydrogen can be used. It is even conceivable to operate it with wood gas or other types of biomass gas. In this case, some of the gas constituents could be burnt in the combustion chambers 3, while others, such as tar or further long-chain hydrocarbon compounds, would be cracked into short-chain hydrocarbons on account of the high temperatures in the combustion chamber 3, whereupon these would be burnt in the flow-through chamber 5. This means that expensive gas cleaning is not necessary. Additionally, water can be injected into one of the combustion chambers 3 or in the flow-through chamber 5. Water can also be added to the fuel for further increase of the performance.

Figure 4:
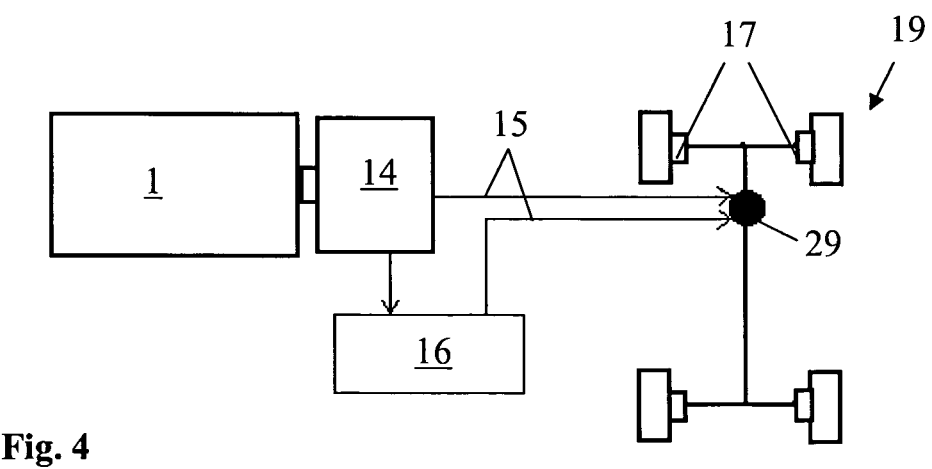
FIG. 4 shows a schematic view of the drive system for vehicles operated with the combustion turbine according to the invention.

FIG. 4 shows a drive system for a vehicle 19 by way of example, where the combustion turbine according to the invention drives a generator 14 for power production. The electric current 15 thus produced can be directly fed to a vehicle drive engine 17. It is also conceivable for the electric current 15 to be previously fed to a battery 16. The corresponding control would be assured by a vehicle governor 29. The combustion turbine can, in this case, be operated either continually or intermittently.

The embodiments shown in the figures merely represent preferred embodiments of the invention. The invention also comprises other embodiments, for instance, an embodiment comprising several flow-through chambers 5 instead of just one flow-through chamber 5 to make the process gas flow uniform. Post-combustion could be operated also in these several flow-through chambers 5.

The invention claimed is:

1. A combustion turbine for discontinuous combustion comprising:
   at least one combustion chamber having inlet valves and an ignition device, the at least one combustion chamber having no shut-off devices on an off-gas side and thus being at all times open on the off-gas side,
   a turbine, which can be impinged with process gas obtained in the combustion chamber, is positioned downstream of the at least one combustion chamber,
   a flow-through chamber positioned between the at least one combustion chamber and the turbine axially downstream of the at least one combustion chamber, the flow-through chamber being separated from the at least one combustion chamber by a guiding plate, where the guiding plate is designed of a perforated plate which includes a plurality of through openings in form of elongated through slots of circular arc shape, which extend with a respective longitudinal axis thereof circumferentially about a center of the guiding plate, and which are arranged to be circumferentially spaced from each other in a plurality of radial layers, radially spaced from each other, and which are concentrically located about the center of the guiding plate, and
   wherein the at least one combustion chamber includes several combustion chambers, each combustion chamber is connected to the flow-through chamber.

2. The combustion turbine according to claim 1, wherein the flow-through chamber includes valve openings through which air can be fed.

3. The combustion turbine according to claim 1, wherein the flow-through chamber includes a secondary ignition system.

4. The combustion turbine according to claim 1, further comprising at least one injection nozzle is positioned in the flow-through chamber for infeed of a fuel.

5. The combustion turbine according to claim 1, further comprising a guide vane mechanism positioned between the flow-through chamber and the turbine.

6. The combustion turbine according to claim 1, further comprising current-carrying elements positioned in the flow-through chamber for creating a swirl.

7. The combustion turbine according to claim 1, wherein the flow-through chamber includes a laval nozzle.

8. A process for operation of a combustion turbine, where air is fed through inlet valves to at least one combustion chamber, mixed with a fuel and burnt in the combustion chamber, which is not closed on the outlet side, and a turbine is impinged with the process gas obtained in this manner, with the process gas flowing through a flow-through chamber positioned axially downstream of the at least one combustion chamber before impinging the turbine with it, wherein the process gas being fed from the at least one combustion chamber to the flow-through chamber via a guiding plate that includes a plurality of through openings in form of elongated through slots of circular arc shape, which extend with a respective longitudinal axis thereof circumferentially about a center of the guiding plate, and which are arranged to be circumferentially spaced from each other in a plurality of radial layers, radially spaced from each other, and which are concentrically located about the center of the guiding plate, wherein the at least one combustion chamber includes several combustion chambers, each combustion chamber is connected to the flow-through chamber.

9. The process according to claim 8, wherein air being fed to the process gas in the flow-through chamber intermittently.

10. The process according to claim 8, wherein operating post-combustion of the process gas in the flow-through chamber.

11. The process according to claim 8, wherein additional fuel being fed to the flow-through chamber for post-combustion.

12. The process according to claim 8, wherein the process gas being made to swirl after the at least one combustion chamber before being fed to the turbine.

13. A drive system for machines having a combustion engine including the combustion turbine according to claim 1.

14. The combustion turbine according to claim 1, wherein the at least one combustion chamber includes four combustion chambers.

15. A combustion turbine for discontinuous combustion comprising:

at least one combustion chamber having no shut-off devices on an off-gas side and thus being at all times open on the off-gas side, said at least one combustion chamber having
at least one inlet valve, and
an ignition device;
a turbine positioned downstream of said at least one combustion chamber, said turbine capable of being impinged with process gas from said at least one combustion chamber;
at least one flow-through chamber connecting said at least one combustion chamber and said turbine, said at least one flow-through chamber is axially downstream of the at least one combustion chamber; and
a guiding plate separating said at least one flow-through chamber from said at least one combustion chamber, where the guiding plate includes a plurality of through openings in form of elongated through slots of circular arc shape, which extend with a respective longitudinal axis thereof circumferentially about a center of the guiding plate, and which are arranged to be circumferentially spaced from each other in a plurality of radial layers, radially spaced from each other, and which are concentrically located about the center of the guiding plate, and
wherein the at least one combustion chamber includes several combustion chambers, each combustion chamber is connected to the flow-through chamber.

16. The combustion turbine according to claim 1, wherein the through openings of adjacent radial layers are arranged to be circumferentially offset relative to any neighboring radial layer.

17. The combustion turbine according to claim 1, wherein the guiding plate further includes a plurality of through openings of tear drop shape circumferentially and concentrically arranged about a center of the guiding plate on an inner radial layer which is located within the most inner radial layer of the elongated through slots.

18. The combustion turbine according to claim 1, wherein the through openings in the guiding plate have a shape selected from a group consisting of cylindrical, conical, and laval-shaped.

19. The combustion turbine according to claim 1, wherein the guiding plate further includes flow guiding elements capable of generating a swirl flow in the gas passing through the guiding plate.

20. The combustion turbine according to claim 15, wherein the guiding plate further includes a plurality of through openings of tear drop shape circumferentially and concentrically arranged about a center of the guiding plate on an inner radial layer which is located within the most inner radial layer of the elongated through slots.

* * * * *